(12) United States Patent
Waggle et al.

(10) Patent No.: US 9,833,846 B2
(45) Date of Patent: Dec. 5, 2017

(54) ROTARY CUTTING TOOL WITH HIGH-PRESSURE, THREADED COOLANT CAP

(71) Applicant: Kennametal Inc., Latrobe, PA (US)

(72) Inventors: James Michael Waggle, Derry, PA (US); Ronald Louis Dudzinsky, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 330 days.

(21) Appl. No.: 14/452,457

(22) Filed: Aug. 5, 2014

(65) Prior Publication Data

US 2016/0039016 A1 Feb. 11, 2016

(51) Int. Cl.
*B23C 5/28* (2006.01)
*B23C 5/00* (2006.01)

(52) U.S. Cl.
CPC ............... *B23C 5/28* (2013.01); *B23C 5/006* (2013.01); *B23C 2240/32* (2013.01); *B23C 2250/12* (2013.01)

(58) Field of Classification Search
CPC ... B23C 2240/32; B23C 2250/12; B23C 5/28; B23C 5/006; B23C 5/26; B23C 2240/245; B23Q 11/1023
USPC .......................................................... 407/11
See application file for complete search history.

(56) References Cited

U.S. PATENT DOCUMENTS

| | | | | | |
|---|---|---|---|---|---|
| 559,012 | A | * | 4/1896 | Warren .................. | B64C 11/04 12/91 |
| 1,337,313 | A | * | 4/1920 | Groene .................. | B23C 5/26 409/234 |
| 1,400,021 | A | * | 12/1921 | Brubaker ............. | B23D 77/006 408/57 |
| 2,807,443 | A | * | 9/1957 | Wyman ................. | E21B 10/38 175/393 |
| 2,809,419 | A | * | 10/1957 | Adams .................. | B23D 71/00 407/29.13 |
| 5,542,792 | A | * | 8/1996 | Krueger ............. | B23B 31/1074 407/35 |
| 5,667,428 | A | * | 9/1997 | Lunn .................... | B24B 41/047 407/1 |
| 5,993,297 | A | * | 11/1999 | Hyatt ...................... | B24B 55/02 451/450 |
| 8,573,098 | B2 | * | 11/2013 | Hoffer ...................... | B23C 5/28 407/11 |

(Continued)

FOREIGN PATENT DOCUMENTS

DE 4033607 A1 4/1992
DE 19725100 A1 12/1998
(Continued)

OTHER PUBLICATIONS

Feb. 16, 2016 First office Action.

*Primary Examiner* — Sara Addisu
(74) *Attorney, Agent, or Firm* — Matthew S. Bedsole

(57) ABSTRACT

A rotary cutting tool includes a cutter body and a coolant cap removably secured to the cutter body. The coolant cap includes an outer surface, an inner surface and a generally cylindrical outer surface extending between the outer surface and the inner surface. The cylindrical outer surface has a second cylindrical outer surface portion with external threads formed thereon such that the coolant cap is capable of being threaded onto the cutter body.

18 Claims, 6 Drawing Sheets

(56) References Cited

U.S. PATENT DOCUMENTS

| | | | |
|---|---|---|---|
| 8,858,125 B2 * | 10/2014 | Pilkington | 407/11 |
| 9,238,273 B2 * | 1/2016 | Lehto | B23C 5/26 |
| 2002/0009339 A1 * | 1/2002 | Arvidsson | B23C 5/006 |
| | | | 407/35 |
| 2002/0106251 A1 * | 8/2002 | Ripley | B23C 5/28 |
| | | | 407/35 |
| 2004/0042858 A1 * | 3/2004 | Sheffler | B23C 5/006 |
| | | | 407/11 |
| 2006/0029481 A1 | 2/2006 | Craig et al. | |
| 2008/0175676 A1 | 7/2008 | Prichard et al. | |
| 2008/0175677 A1 | 7/2008 | Prichard et al. | |
| 2009/0123244 A1 * | 5/2009 | Buettiker | B23B 31/1107 |
| | | | 408/233 |
| 2009/0226268 A1 * | 9/2009 | Pilkington | B23C 5/28 |
| | | | 407/113 |
| 2011/0217131 A1 * | 9/2011 | Bonnarang | B23C 5/28 |
| | | | 407/11 |
| 2011/0250827 A1 * | 10/2011 | Smith | B23D 59/025 |
| | | | 451/449 |
| 2012/0230781 A1 | 9/2012 | Hoffer | |
| 2013/0217313 A1 * | 8/2013 | Butler | B23B 31/02 |
| | | | 451/450 |

FOREIGN PATENT DOCUMENTS

| | | | | |
|---|---|---|---|---|
| DE | 10295201 T5 | 4/2004 | | |
| DE | 102009008308 A1 * | 2/2010 | | B23C 5/08 |
| DE | 60110483 T3 | 6/2011 | | |
| DE | 102011050176 A1 | 8/2012 | | |
| EP | 2517815 B1 | 11/2013 | | |
| FR | WO 2010128930 A1 * | 11/2010 | | B23C 5/08 |
| KR | 100576319 B | 5/2006 | | |
| KR | 100634609 B | 10/2006 | | |
| WO | 2010/020234 A1 | 2/2010 | | |

* cited by examiner

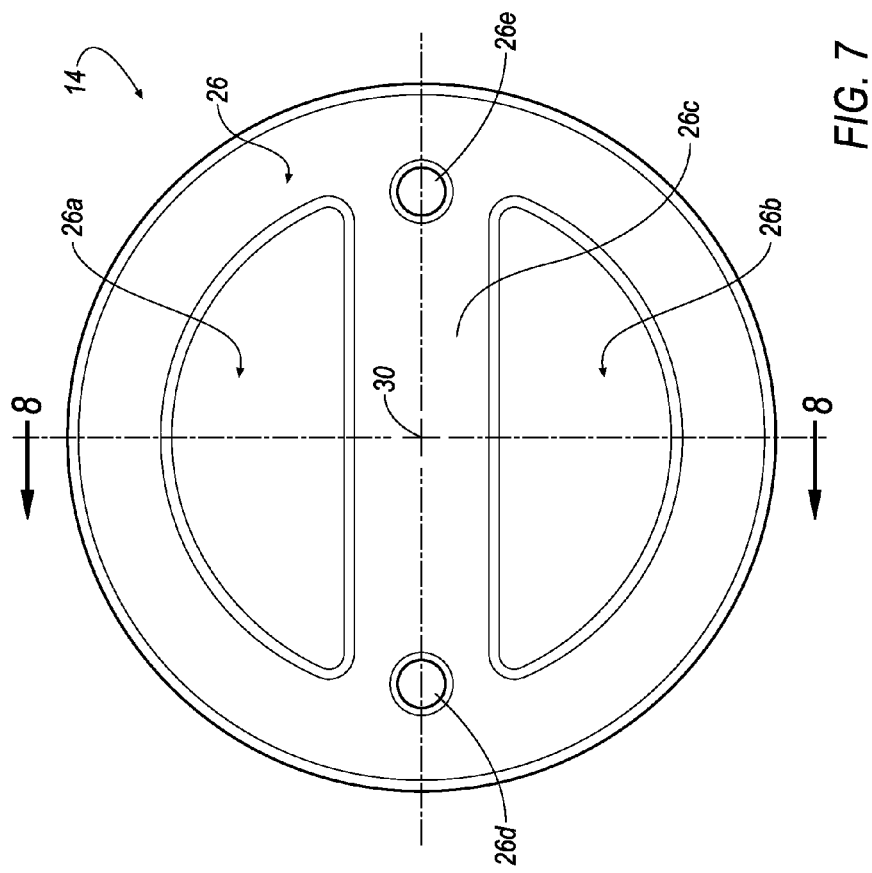
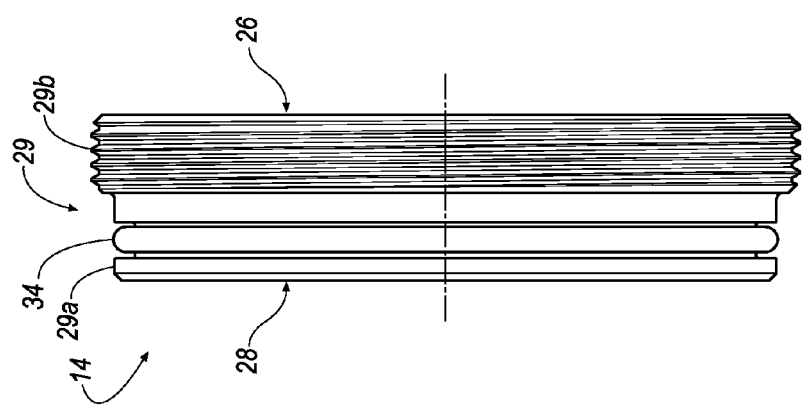

ROTARY CUTTING TOOL WITH HIGH-PRESSURE, THREADED COOLANT CAP

BACKGROUND OF THE INVENTION

Field of the Invention

The invention pertains to the field of rotary cutting tools. More particularly, the invention pertains to a rotary cutting tool with a high-pressure, threaded coolant cap for delivering high-pressure coolant flow in the vicinity of the cutting inserts mounted on the cutter body.

Description of Related Art

Milling cutters for milling operations are well known. Such milling cutters typically comprise a cutter body, which is a generally circular shaped ring having a plurality of pockets in an outer periphery thereof. A cutting insert is secured in each pocket. Each cutting insert comprises a body and at least one cutting edge. The body is secured directly in the pocket or to a cartridge, which is secured in the pocket.

In the past, it has been common to carry cutting fluid to the vicinity of the cutting inserts of the cutting tool through conduits drilled in the body of the cutting tool. A coolant cap is typically mounted to the cutter body using a plurality of threaded fasteners, such as bolts, and the like, threaded into the cutter body. Unfortunately, it has been found that the threaded fasteners can fail when high-pressure coolant flow is provided to the cutting tool, thereby causing the coolant to leak between the coolant cap and the cutter body.

Accordingly, there is a need in the art for an improved cutting tool that is capable of delivering high-pressure coolant flow in the vicinity of the cutting inserts.

SUMMARY OF THE INVENTION

The problem of delivering high-pressure coolant flow to the vicinity of cutting inserts mounted on the cutter body is solved by providing a coolant cap with external threads for mounting the coolant cap to the cutter body.

In one aspect of the invention, a cutting tool comprises a cutter body having a recessed surface formed in a front face of the cutter body, the recessed surface includes a threaded surface, and a coolant cap removably secured to the cutter body. The coolant cap includes an outer surface, an inner surface and a cylindrical outer surface extending between the outer surface and the inner surface. The cylindrical outer surface has a second cylindrical outer surface portion with external threads formed thereon such that the coolant cap is capable of being threaded onto the cutter body.

In another aspect of the invention, a coolant cap for a cutting tool comprises an outer surface, an inner surface and a cylindrical outer surface extending between the outer surface and the inner surface. The cylindrical outer surface has a second cylindrical outer surface portion with external threads formed thereon such that the coolant cap is capable of being threaded onto the cutter body.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 6 is a side view of the coolant cap of FIG. 4;

FIG. 7 is a top view of the coolant cap of FIG. 4; and

DETAILED DESCRIPTION OF THE INVENTION

Figure 1:
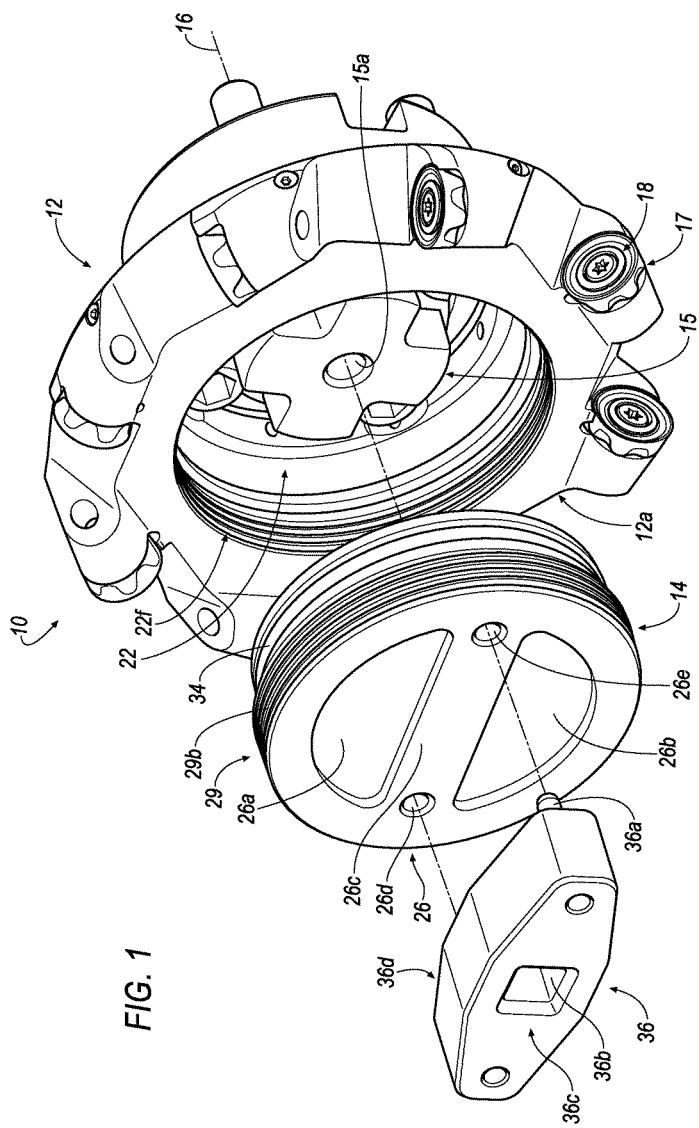
FIG. 1 is an exploded, isometric view of a cutting tool with a coolant cap and a wrench adapter for the coolant cap according to an embodiment of the invention.
Figure 2:
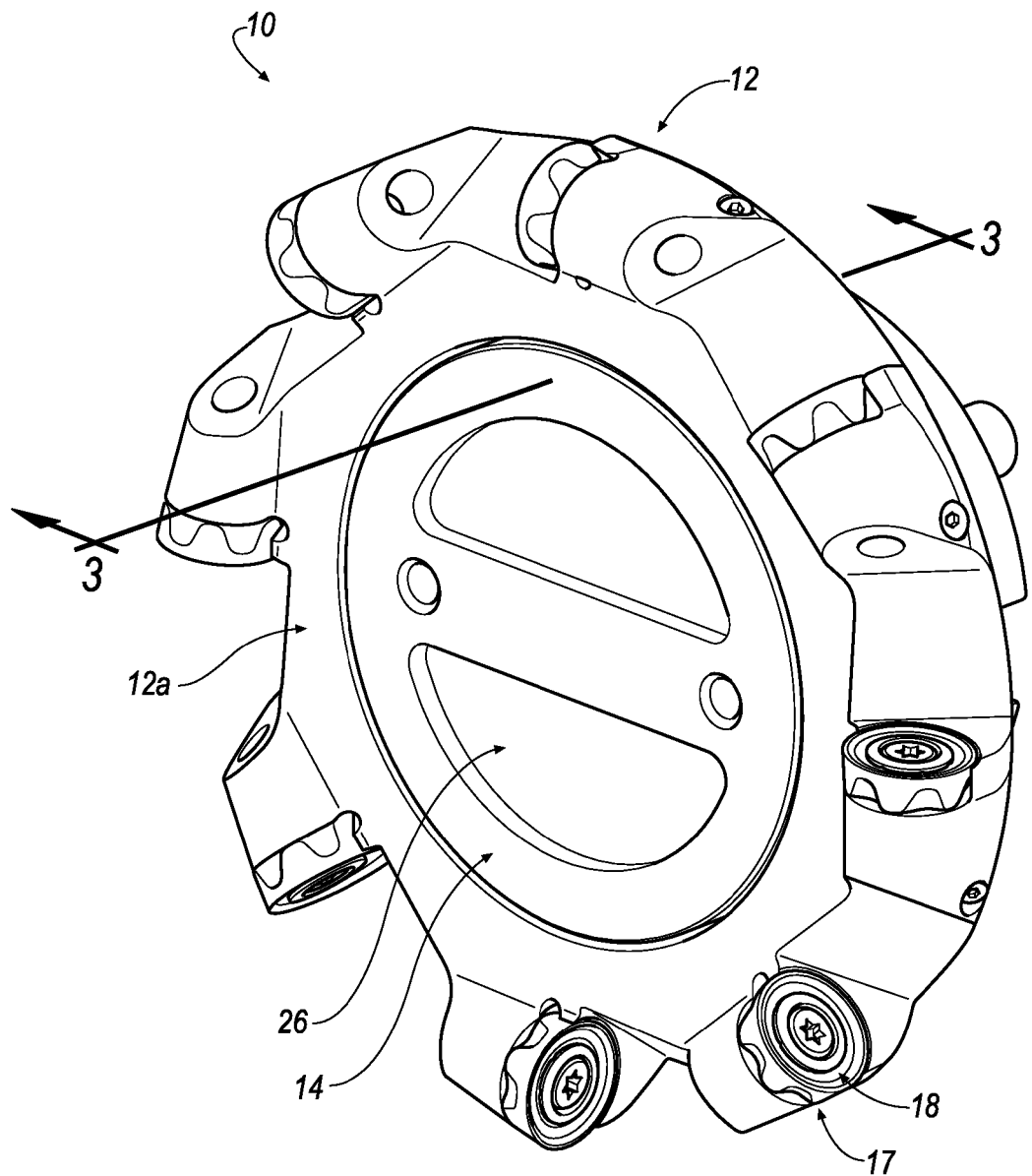
FIG. 2 is an isometric view of the cutting tool of FIG. 1 assembled with the coolant cap threaded onto the cutter body.
Figure 3:
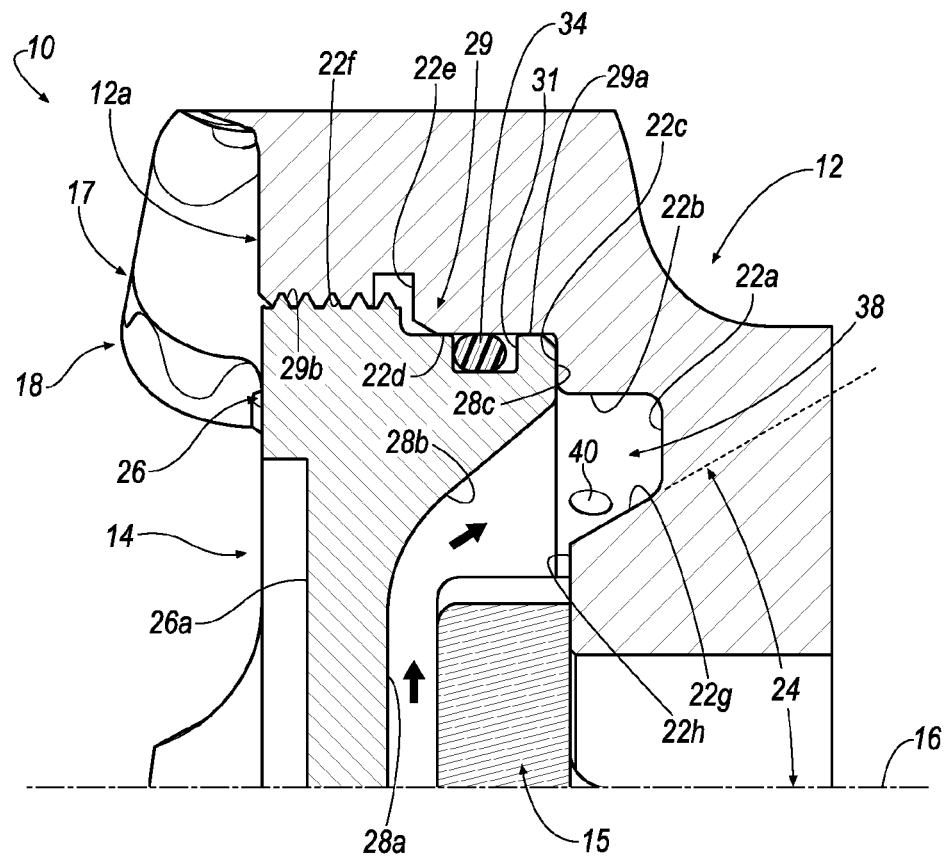
FIG. 3 is an enlarged, partial cross-sectional view of the coolant cap threaded onto the cutter body showing the coolant chamber between the coolant cap and the cutter body taken along line 3-3 of FIG. 2.
Figure 4:
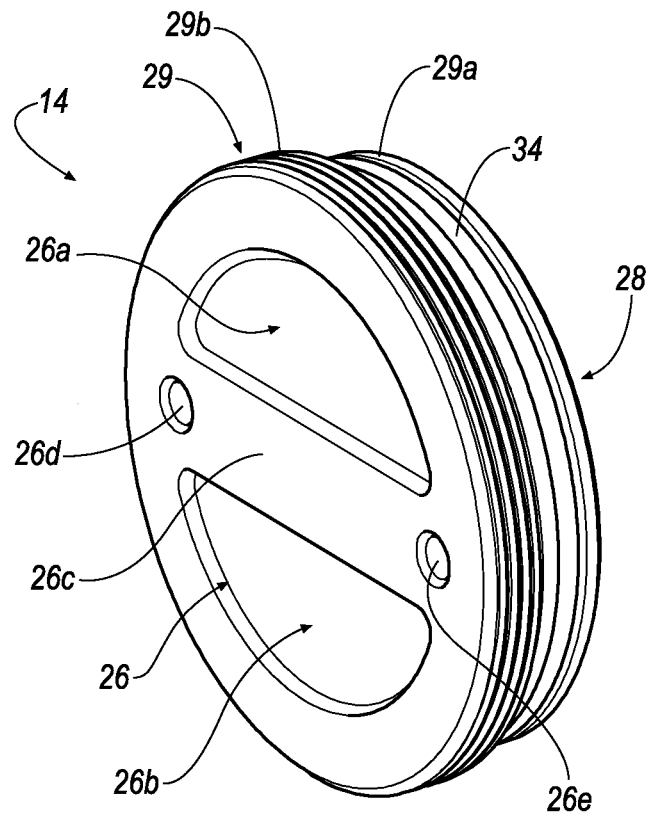
FIG. 4 is an isometric view of the coolant cap according to an embodiment of the invention.
Figure 5:
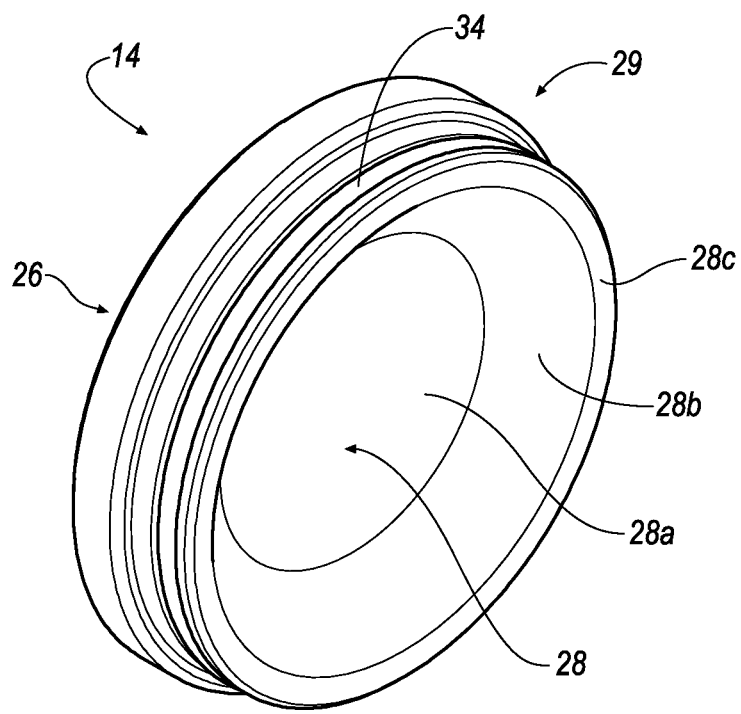
FIG. 5 is another isometric view of the coolant cap according to an embodiment of the invention.

Referring now to FIGS. 1-3, wherein like numerals designate like components throughout all of the several figures, there is illustrated a rotary cutting tool 10 according to a preferred embodiment of the invention. In the illustrated embodiment, the rotary cutting tool 10 comprises a milling cutter. In general, the milling cutter 10 comprises a cutter body 12 and a coolant cap 14 provided at the center of the cutter body 12 for directing a flow of high-pressure coolant in an efficient manner from the cutter body 12.

Typically, a retaining screw 15 is used to mount the cutter body 12 to a rotatable shaft, shaft adapter, or spindle of a milling machine (not shown). Optionally, the retaining screw 15 can be replaced with other means for mounting the cutter body 12 to the milling machine, such as threaded fasteners, and the like. The retaining screw 15 is arranged about an axis 16 of rotation of the milling cutter 10, which coincides with the axis of rotation of the milling machine to which the milling cutter 10 is mounted. The retaining screw 15 has a central opening 15a to allow coolant to pass therethrough. The cutter body 12 also has a plurality of insert-receiving pockets 17 successively defined on the outer peripheral surface of the cutter body 12. Each of the pockets 17 is of a prescribed dimension.

Cutting inserts 18, for example, made of high-speed steel, powder metal, carbides or ceramics, are held respectively within the pockets 17 successively without interruptions or gaps therebetween. As shown in the illustrated embodiment, a total of eight (8) cutting inserts 18 are mounted in the cutting body 12. However, it will be appreciated that the invention is not limited by the number of cutting inserts 18 that are mounted in the cutter body 12, and that the principles of the invention can be applied to a cutter body 12 in which any desirable number of cutting inserts 18 can be isometrically and/or tangentially mounted therein.

As shown in FIG. 1, the cutter body 12 also includes a generally circular recessed surface 22 formed in a front face 12a of the cutter body 12. As shown in FIG. 3, the recessed surface 22 includes a bottom surface 22a, a first cylindrical surface 22b extending axially (in the direction of the rotational axis 16 or x-axis) from the bottom surface 22a toward the front face 12a, a cap seating surface 22c extending radially outward (in the direction perpendicular to the rotational axis 16 or x-axis) with respect to the first cylindrical surface 22b. The recessed surface 22 also includes a second cylindrical surface 22d extending axially from the cap seating surface 22c toward the front face 12a, a cap clearance notch 22e extending radially outward with respect to the second cylindrical surface 22d, and a third cylindrical surface 22*f* extending axially from the cap clearance notch 22*e* to the front face 12*a* of the cutter body 12. The third cylindrical surface 22*f* has external threads for allowing the coolant cap 14 to be threaded onto the cutter body 12. In addition, the recessed surface 22 includes a tapered inner surface 22*g* extending radially inward with respect to the bottom surface 22*a* and a retaining screw seating surface 22*h* extending radially inward with respect to the tapered inner surface 22*g*.

In the illustrated embodiment, the retaining screw seating surface 22*h* is substantially coplanar with the cap seating surface 22*c*. However, the invention can be practiced with non-coplanar seating surfaces 22*c*, 22*h*. The bottom surface 22*a*, the first cylindrical surface 22*b*, the cap seating surface 22*c*, the second cylindrical surface 22*d*, the cap clearance notch 22*e*, the third cylindrical surface 22*f*, the tapered inner surface 22*g* and the seating surface 22*h* are concentrically disposed about the central axis 16. In the illustrated embodiment, the cap seating surface 22*c* and the retaining screw seating surface 22*h* are substantially parallel to the bottom surface 22*a*. However, the tapered inner surface 22*g* is formed at an angle 24 with respect to the central axis 16. In the illustrated embodiment, the angle 24 can be in the range of between about forty (40) degrees and about seventy (70) degrees.

As illustrated in FIGS. 4-8, the coolant cap 14 is generally circular-shaped and preferably made of a steel, so as to be able to withstand high-pressure coolant. As used herein, high-pressure coolant is coolant having a pressure between about 900 psi (62.0 bars) to about 1500 psi (103.4 bars). The coolant cap 14 has a generally planar outer surface 26, an inner surface 28, a cylindrical outer surface 29 extending between the outer surface 26 and the inner surface 28 and a central axis 30. The outer surface 26 includes a pair of generally semi-circular shaped recessed areas 26*a*, 26*b* separated by a central portion 26*c*. In the illustrated embodiment, the recessed areas 26*a*, 26*b* are substantially identical in shape and are mirror symmetric with respect to the central axis 30 of the coolant cap 14. The purpose of the recessed areas 26*a*, 26*b* is to allow the user to thread the coolant cap 14 onto the cutter body 12 by hand. The central portion 26*c* also includes a pair of pilot holes 26*d*, 26*e* adapted to receive pins 36*a* extending from an wrench adapter 36 (FIG. 1). The purpose of the wrench adapter 36 is to further thread the coolant cap 14 onto the cutter body 12 using a drive on a standard socket wrench (not shown). In the illustrated embodiment the pilot holes 26*d*, 26*e* are symmetrically disposed about the central axis 30 of the coolant cap 14.

The inner surface 28 of the coolant cap 14 includes a substantially planar bottom surface 28*a*, a tapered inner surface 28*b* extending radially outward with respect to the bottom surface 28*a* and a seating surface 28*c* extending radially outward from the tapered inner surface 28*b* to the cylindrical outer surface 29. The bottom surface 28*a*, the tapered inner surface 28*b* and the seating surface 28*c* are concentrically disposed about the central axis 30 of the coolant cap 14. The tapered inner surface 28*b* is formed at an angle 32 with respect to the central axis 30 of the coolant cap 14. The angle 32 can be in the range of between about forty (40) degrees and about seventy (70) degrees. It is noted that the central axis 30 of the coolant cap 14 is substantially aligned and parallel with the central axis 16 of the cutter body 12 when the coolant cap 14 is mounted to the cutter body 12. Thus, the angle 32 can be in the range of between about forty (40) degrees and about seventy (70) degrees with respect to the central axis 16 of the cutter body 12.

Figure 8:
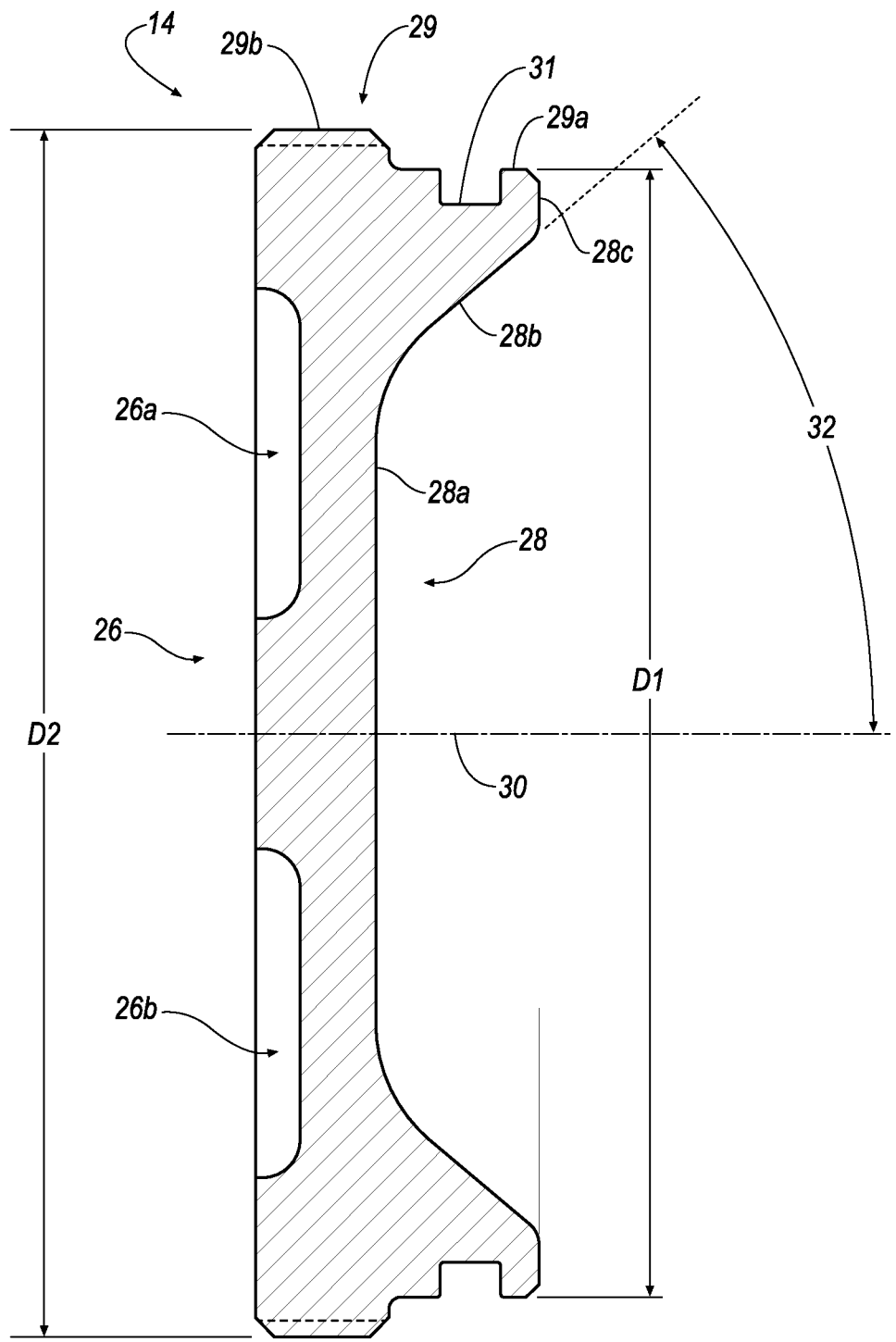
FIG. 8 is a cross-sectional view of the coolant cap of FIG. 4 taken along line 8-8 of FIG. 7.

Referring now to FIG. 8, the cylindrical outer surface 29 of the coolant cap 14 includes a first cylindrical outer surface portion 29*a* extending axially (in the direction of the central axis 30 or x-axis) from the inner surface 28. The first cylindrical outer surface portion 29*a* has an outer diameter, D1, and a notch 31 formed therein. The notch 31 is configured to accommodate a sealing member 34, such as an O-ring, and the like (FIG. 3). The purpose of the sealing member 34 is to prevent high-pressure coolant from leaking between the cutter body 12 and the coolant cap 14. The cylindrical outer surface 29 also includes a second cylindrical outer surface portion 29*b* with external threads formed thereon that are capable of mating with the external threads formed on the third cylindrical surface 22*f* of the recessed surface 22 of the cutter body 12, so that the coolant cap 14 can be threaded onto the cutter body 12. The second cylindrical outer surface portion 29*b* has an outer diameter, D2, which is larger than the outer diameter, D1, of the first cylindrical outer surface portion 29*a*. It should be noted that the outer diameter, D1, of the first cylindrical outer surface portion 29*a*, and the outer diameter, D2, of the second cylindrical outer surface portion 29*b* are slightly smaller than the outer diameter of the second cylindrical surface 22*d* and the third cylindrical surface 22*f* of the recessed surface 22 of the cutter body 12, respectively, so that the coolant cap 14 makes a snug fit when threaded onto the cutter body 12, as shown in FIG. 3.

As mentioned above, the recessed areas 26*a*, 26*b* allow the user to thread the coolant cap 14 onto the cutter body 12 by hand. In addition, the pilot holes 26*d*, 26*e* are adapted to receive pins 36*a* extending from a rear face 36*d* on an wrench adapter 36, as shown in FIG. 1. The purpose of the wrench adapter 36 is to further thread the coolant cap 14 onto the cutter body 12 using a drive on a standard socket wrench (not shown). The drive (not shown) can be inserted into a drive opening 36*b* formed in the front face 36*c* of the drive adapter 36.

Referring back to FIG. 3, the cap seating surface 22*c* of the cutter body 12 contacts the seating surface 28*c* of the coolant cap 14 when the coolant cap 14 is properly threaded onto the cutter body 12 such that the bottom surface 28*a* of the inner surface 28 of the coolant cap 14 is located in spaced relation to the retaining screw 15. Similarly, the tapered surface 28*b* of the inner surface 28 of the coolant cap 14 is located in spaced relation to the tapered surface 22*g* of the recessed surface 22 of the cutter body 12. This spaced relationship between the cutter body 12, the retaining screw 15 and the coolant cap 14 forms a coolant chamber 38 through which high-pressure coolant, such as fluid, and the like, is directed from the spindle of a milling machine (not shown) to the vicinity of the cutting inserts 18. Specifically, the high-pressure coolant is directed through the central opening 15*a* of the retaining screw 15 and flows in the direction of the arrows through the coolant chamber 38 and into a plurality of coolant openings 40 formed in the cutter body 12 (only one coolant opening 40 is shown in FIG. 3 for brevity). The coolant openings 40 direct the high-pressure coolant radially outward in an efficient manner from the coolant chamber 38 to a vicinity of the cutter insert 18.

Simulation using Finite Element Analysis (FEA) have indicated that the coolant cap 14 of the invention is capable of directing high-pressure coolant (i.e., coolant having a pressure between about 900 psi (62.0 bars) to about 1500 psi (103.4 bars)) without leakage due to failure of the coolant cap 14. As a result, the coolant cap 14 of the invention is capable of superior delivery of high-pressure coolant to the vicinity of the cutting inserts 18 as compared to conventional coolant caps.

The patents and publications referred to herein are hereby incorporated by reference.

Having described presently preferred embodiments the invention may be otherwise embodied within the scope of the appended claims.

What is claimed is:

1. A rotary cutting tool, comprising:
   a cutter body having a recessed surface formed in a front face of the cutter body, the recessed surface includes a cylindrical surface; and
   a coolant cap removably secured to the cutter body, the coolant cap including an outer surface, an inner surface and a cylindrical outer surface extending between the outer surface and the inner surface, the cylindrical outer surface having a first cylindrical outer surface portion directly adjacent to and extending axially from the inner surface and a second cylindrical outer surface portion directly adjacent to and extending axially from the outer surface with external threads formed thereon such that the coolant cap is capable of being threaded onto the cutter body,
   wherein an outer diameter of the second cylindrical outer surface portion of the coolant cap is greater than an outer diameter of the first cylindrical outer surface portion of the coolant cap.

2. The rotary cutting tool of claim 1, wherein the inner surface of the coolant cap includes a substantially planar bottom surface, a tapered inner surface extending radially outward with respect to the bottom surface and a seating surface extending radially outward from the tapered inner surface to the cylindrical outer surface.

3. The rotary cutting tool of claim 2, wherein the tapered inner surface is formed at an angle of between about forty degrees and about seventy degrees with respect to a central axis of the coolant cap.

4. The rotary cutting tool of claim 1, wherein the outer surface of the coolant cap includes a pair of generally semi-circular shaped recessed areas separated by a central portion to allow a user to thread the coolant cap onto the cutter body by hand.

5. The rotary cutting tool of claim 4, wherein the central portion also includes a pair of pilot holes adapted to receive pins extending from a wrench adapter.

6. The rotary cutting tool of claim 1, wherein the cylindrical surface of the recessed surface is a third cylindrical surface; and
   wherein the recessed surface includes a bottom surface, a first cylindrical surface extending axially from the bottom surface toward a front face of the cutter body, a cap seating surface extending radially outward with respect to the first cylindrical surface, a second cylindrical surface extending axially from the cap seating surface toward the front face, and a cap clearance notch extending radially outward with respect to the second cylindrical surface.

7. The rotary cutting tool of claim 6, wherein the recessed surface further includes a tapered inner surface extending radially inward with respect to the bottom surface and a retaining screw seating surface extending radially inward with respect to the tapered inner surface.

8. The rotary cutting tool of claim 7, wherein the tapered inner surface is formed at an angle between about forty degrees and about seventy degrees with respect to a central axis of the cutter body.

9. A coolant cap for a rotary cutting tool, comprising:
   an outer surface;
   an inner surface; and
   a cylindrical outer surface extending between the outer surface and the inner surface, the cylindrical outer surface having a first cylindrical outer surface portion directly adjacent to and extending axially from the inner surface and a second cylindrical outer surface portion directly adjacent to and extending axially from the outer surface with external threads formed thereon such that the coolant cap is capable of being threaded onto the cutter body,
   wherein an outer diameter of the second cylindrical outer surface portion of the coolant cap is greater than an outer diameter of the first cylindrical outer surface portion of the coolant cap.

10. The coolant cap of claim 9, wherein the inner surface of the coolant cap includes a substantially planar bottom surface, a tapered inner surface extending radially outward with respect to the bottom surface and a seating surface extending radially outward from the tapered inner surface to the cylindrical outer surface.

11. The coolant cap of claim 10, wherein the tapered inner surface is formed at an angle of between about forty degrees and about eight degrees with respect to a central axis of the coolant cap.

12. The coolant cap of claim 9, wherein the outer surface of the coolant cap includes a pair of generally semi-circular shaped recessed areas separated by a central portion to allow a user to thread the coolant cap onto the cutter body by hand.

13. The coolant cap of claim 12, wherein the central portion also includes a pair of pilot holes adapted to receive pins extending from an wrench adapter.

14. A rotary cutting tool, comprising:
   a cutter body having a recessed surface formed in a front face of the cutter body, the recessed surface includes a cylindrical surface; and
   a coolant cap removably secured to the cutter body, the coolant cap including an outer surface, an inner surface and a cylindrical outer surface extending between the outer surface and the inner surface, the cylindrical outer surface having a second cylindrical outer surface portion with external threads formed thereon such that the coolant cap is capable of being threaded onto the cutter body, wherein the inner surface of the coolant cap includes a substantially planar bottom surface, a tapered inner surface extending radially outward with respect to the bottom surface and a seating surface extending radially outward from the tapered inner surface to the cylindrical outer surface.

15. The rotary cutting tool of claim 14, wherein the tapered inner surface is formed at an angle of between about forty degrees and about seventy degrees with respect to a central axis of the coolant cap.

16. The rotary cutting tool of claim 14, wherein the cylindrical surface of the recessed surface is a third cylindrical surface; and
   wherein the recessed surface includes a bottom surface, a first cylindrical surface extending axially from the bottom surface toward a front face of the cutter body, a cap seating surface extending radially outward with respect to the first cylindrical surface, a second cylindrical surface extending axially from the cap seating surface toward the front face, and a cap clearance notch extending radially outward with respect to the second cylindrical surface.

17. The rotary cutting tool of claim 16, wherein the recessed surface further includes a tapered inner surface extending radially inward with respect to the bottom surface and a retaining screw seating surface extending radially inward with respect to the tapered inner surface.

18. The rotary cutting tool of claim 17, wherein the tapered inner surface is formed at an angle between about forty degrees and about seventy degrees with respect to a central axis of the cutter body.

\* \* \* \* \*